(12) United States Patent
Robertson, Jr. et al.

(10) Patent No.: US 10,731,511 B2
(45) Date of Patent: Aug. 4, 2020

(54) REDUCED FAN CONTAINMENT THREAT THROUGH LINER AND BLADE DESIGN

(71) Applicant: United Technologies Corporation, Hartford, CT (US)

(72) Inventors: Thomas J. Robertson, Jr., Glastonbury, CT (US); Sreenivasa R. Voleti, Farmington, CT (US); Mark W. Costa, Storrs, CT (US); Steven Clarkson, Cheshire, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 808 days.

(21) Appl. No.: 14/432,356

(22) PCT Filed: Feb. 22, 2013

(86) PCT No.: PCT/US2013/027229
§ 371 (c)(1),
(2) Date: Mar. 30, 2015

(87) PCT Pub. No.: WO2014/055105
PCT Pub. Date: Apr. 10, 2014

(65) Prior Publication Data
US 2015/0275692 A1    Oct. 1, 2015

Related U.S. Application Data

(60) Provisional application No. 61/708,191, filed on Oct. 1, 2012.

(51) Int. Cl.
*F01D 25/04*  (2006.01)
*F01D 25/24*  (2006.01)
(Continued)

(52) U.S. Cl.
CPC ............ *F01D 25/24* (2013.01); *F01D 5/021* (2013.01); *F01D 5/147* (2013.01); *F01D 5/28* (2013.01);
(Continued)

(58) Field of Classification Search
CPC .............................. F01D 25/005; F01D 5/021
See application file for complete search history.

(56) References Cited

U.S. PATENT DOCUMENTS 4,149,824 A     4/1979  Adamson
4,293,053 A  *  10/1981 Shuttleworth .......... F02C 7/045
                                                  181/213

(Continued)

FOREIGN PATENT DOCUMENTS

EP    1087105    1/2004
EP    1143112    6/2006
(Continued)

OTHER PUBLICATIONS

International Preliminary Report on Patentability for PCT Application No. PCT/US2013/027229, dated Apr. 16, 2015.
(Continued)

*Primary Examiner* — Kayla Mccaffrey
(74) *Attorney, Agent, or Firm* — Carlson, Gaskey & Olds, P.C.

(57) ABSTRACT

A blade containment system includes a plurality of circumferentially-arranged rotatable blades. Each blade has a blade compliance. An annular containment structure is arranged around the rotatable blades. The containment structure includes a liner that has a liner compliance. The blade compliance and the liner compliance are configured such that a strain induced on a respective one of the blades upon impact with the liner is less than a threshold critical strain beyond which the rotatable blades fracture.

7 Claims, 3 Drawing Sheets

(51) Int. Cl.
  *F01D 5/14* (2006.01)
  *F01D 5/28* (2006.01)
  *F01D 21/04* (2006.01)
  *F01D 5/02* (2006.01)
  *F01D 25/30* (2006.01)

(52) U.S. Cl.
  CPC .......... *F01D 21/045* (2013.01); *F01D 25/30* (2013.01); *F05D 2220/30* (2013.01); *F05D 2240/24* (2013.01); *F05D 2250/283* (2013.01); *F05D 2300/121* (2013.01); *F05D 2300/173* (2013.01); *F05D 2300/612* (2013.01); *Y02T 50/672* (2013.01)

(56) References Cited

U.S. PATENT DOCUMENTS

| | | | |
|---|---|---|---|
| 5,482,429 A * | 1/1996 | Penda | F02C 7/045 415/119 |
| 6,206,631 B1 | 3/2001 | Schilling | |
| 6,227,794 B1 | 5/2001 | Wojtyczka et al. | |
| 6,619,913 B2 * | 9/2003 | Czachor | F01D 21/045 415/119 |
| 6,637,186 B1 | 10/2003 | Van Duyn | |
| 6,769,864 B2 | 8/2004 | Sathianathan et al. | |
| 6,913,436 B2 | 7/2005 | McMillan et al. | |
| 7,047,725 B2 * | 5/2006 | Moe | F02C 7/045 181/210 |
| 7,278,830 B2 | 10/2007 | Vetters | |
| 7,402,022 B2 | 7/2008 | Harper et al. | |
| 7,794,197 B2 | 9/2010 | Thompson et al. | |
| 7,946,827 B2 * | 5/2011 | Beckford | F01D 5/141 416/239 |
| 8,047,764 B2 | 11/2011 | Launders | |
| 2006/0269402 A1 | 11/2006 | Beckford et al. | |
| 2009/0232657 A1 | 9/2009 | Read et al. | |
| 2010/0030365 A1 * | 2/2010 | Lilly | B23Q 17/24 700/163 |
| 2011/0044806 A1 | 2/2011 | Harper | |
| 2013/0195605 A1 * | 8/2013 | Robertson | F01D 11/125 415/1 |

FOREIGN PATENT DOCUMENTS

| | | |
|---|---|---|
| EP | 2305954 | 4/2011 |
| EP | 2458162 | 5/2012 |

OTHER PUBLICATIONS

International Search Report and Written Opinion for International Application No. PCT/US2013/027229 completed on Nov. 21, 2013.
European Search Report for European Patent Application No. 13844100 completed Jul. 20, 2016.

* cited by examiner

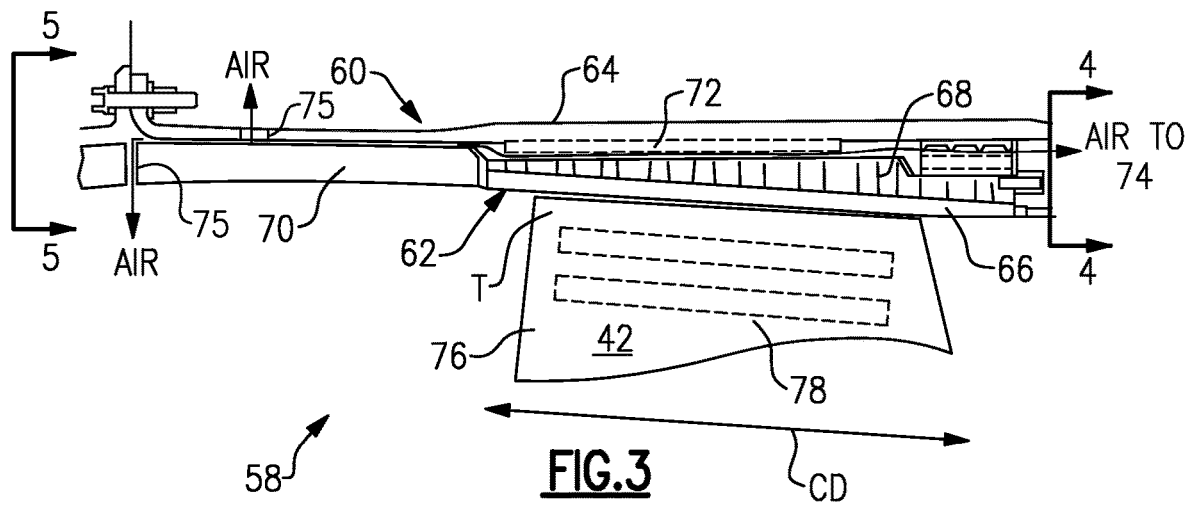
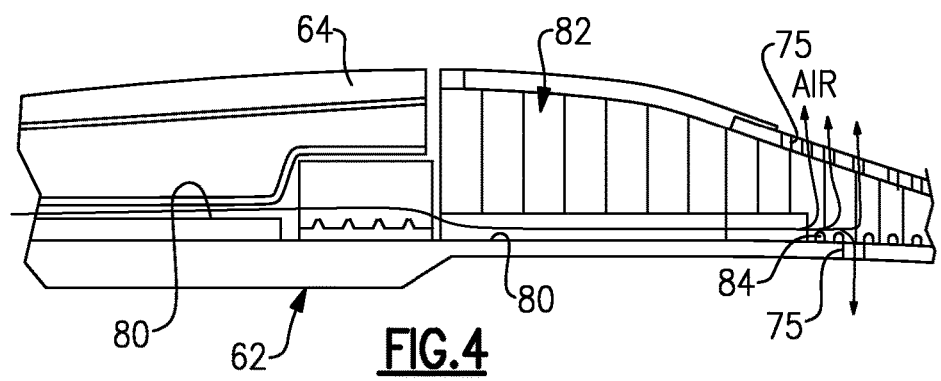
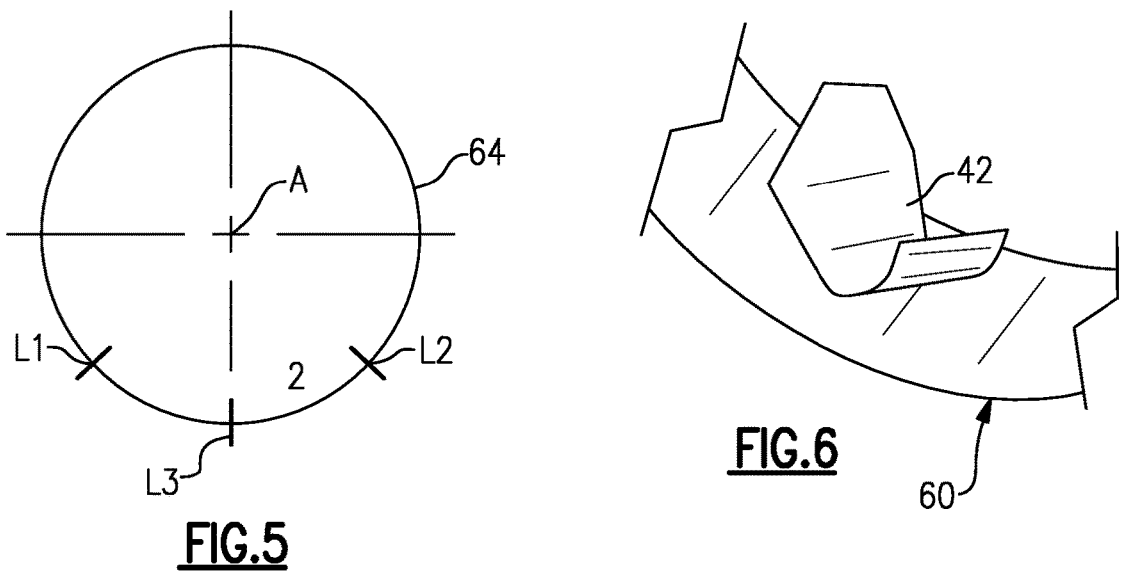

REDUCED FAN CONTAINMENT THREAT THROUGH LINER AND BLADE DESIGN

CROSS REFERENCE TO RELATED APPLICATION

This application claims priority to U.S. Provisional Application No. 61/708,191, which was filed 1 Oct. 2012 and is incorporated herein by reference.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

SUMMARY

A blade containment system according to an exemplary aspect of the present disclosure includes a plurality of circumferentially-arranged rotatable blades. Each blade has a blade compliance. An annular containment structure is located radially outward from the rotatable blades. The annular containment structure includes a liner that has a liner compliance. The blade compliance and the liner compliance are configured such that a strain induced on a respective one of the rotatable blades upon impact with the liner is less than a threshold critical strain beyond which the rotatable blades fracture.

In a further non-limiting embodiment of any of the examples herein, the liner includes a hollow cavity.

In a further non-limiting embodiment of any of the foregoing examples, an inner liner and an outer liner, and the hollow cavity is located radially between the inner liner and the outer liner.

In a further non-limiting embodiment of any of the foregoing examples, the hollow cavity has a vent configured to selectively ventilate a gas from the hollow cavity.

In a further non-limiting embodiment of any of the foregoing examples, the inner liner includes a honeycomb structure.

In a further non-limiting embodiment of any of the foregoing examples, the inner liner additionally includes an abradable layer adjacent the honeycomb structure.

In a further non-limiting embodiment of any of the foregoing examples, each of the rotatable blades includes an interior cavity.

In a further non-limiting embodiment of any of the foregoing examples, the interior cavity is elongated along a chord-direction of each of the rotatable blades.

In a further non-limiting embodiment of any of the foregoing examples, the rotatable blades are made of aluminum alloy.

A blade containment system according to an exemplary aspect of the present disclosure includes an annular containment structure around the rotatable blades. The annular containment structure includes an outer liner and an inner liner with respect to the rotatable blades, with a hollow cavity between the outer liner and the inner liner.

In a further non-limiting embodiment of any of the foregoing examples, the interior cavity is elongated along a chord-direction of each of the rotatable blades.

In a further non-limiting embodiment of any of the foregoing examples, the hollow cavity has a vent configured to selectively ventilate a gas from the hollow cavity.

In a further non-limiting embodiment of any of the foregoing examples, the inner liner includes a honeycomb structure.

In a further non-limiting embodiment of any of the foregoing examples, the inner liner also includes an abradable layer adjacent the honeycomb structure.

In a further non-limiting embodiment of any of the foregoing examples, the inner liner is a replaceable cartridge in the annular containment structure.

A method for managing blade containment according to an exemplary aspect of the present disclosure includes selecting a blade compliance for a plurality of circumferentially-arranged rotatable blades and selecting a liner compliance of a liner of an annular containment structure around the rotatable blades in cooperation with the selecting of the blade compliance such that a strain induced on a respective one of the rotatable blades upon impact with the liner is less than a threshold critical strain of the one of the rotatable blades beyond which the one of the rotatable blades fractures.

In a further non-limiting embodiment of any of the foregoing examples, the selecting of the blade compliance includes selecting the rotatable blades to be made of an aluminum alloy and the rotatable blades to include interior hollow cavities.

In a further non-limiting embodiment of any of the foregoing examples, the selecting of the liner compliance includes selecting the annular containment structure to include an outer liner and an inner liner, with a hollow cavity between the outer liner and the inner liner.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 3 illustrates an example blade containment system.

FIG. 4 illustrates a vent structure of the blade containment system of FIG. 3.

FIG. 5 illustrates angular locations of vent or drain openings of the blade containment system.

FIG. 6 illustrates bending of a released blade during an impact event.

DETAILED DESCRIPTION

Figure 1:
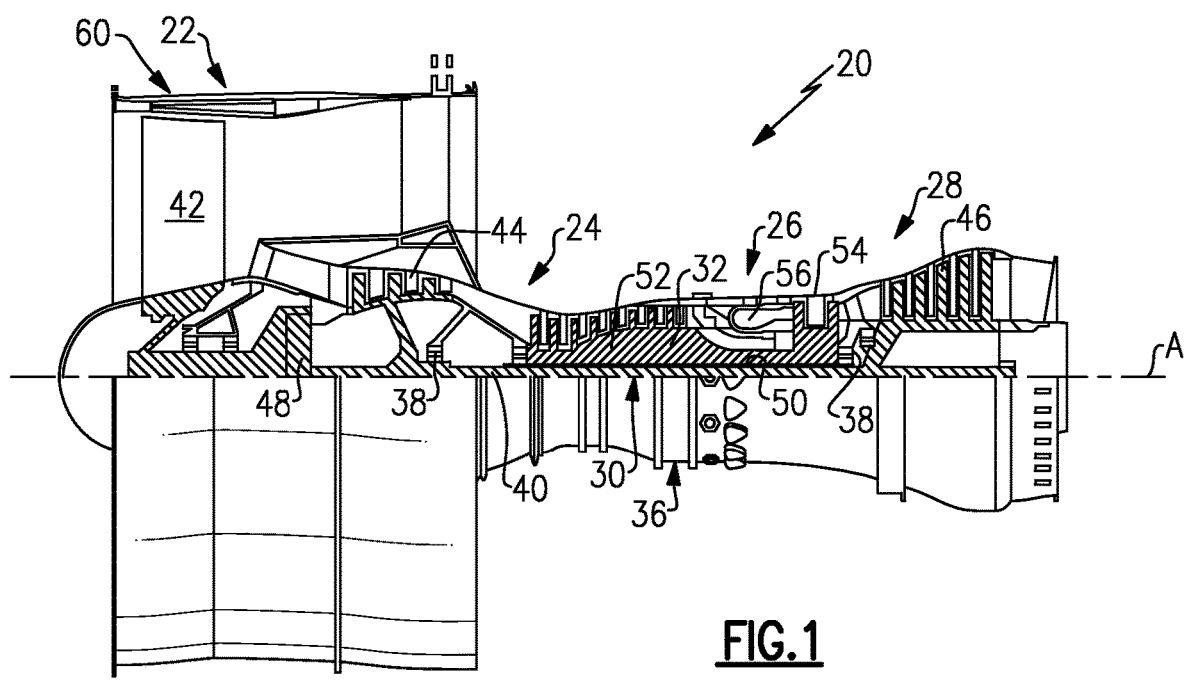
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it is to be understood that the concepts described herein are not limited to use with turbofans and the teachings may be applied to other types of turbine engines, including three-spool architectures and other turbomachines.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects the fan section 22 (having fan blades 42), a first compressor 44 and a first turbine 46. The first shaft 40 is connected to the fan section 22 through a gear assembly of a fan drive gear system 48 to drive the fan section 22 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan blades 42 have a fan diameter such that a ratio of the maximum rotor diameter divided by the fan diameter is less than 0.6. It should be understood, however, that the above parameters are only exemplary.

A significant amount of thrust is provided by the bypass flow due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Certain events can cause a release of a fan blade in an engine. A containment structure can be provided around the fan to contain the released blade or blades. A challenging containment event involves a full blade break at a blade root while the engine is spinning at maximum operating speed. A containment event can include a primary release of a blade and a second following blade. The impact on the containment structure or case around the fan can include an in-plane strike and a flop strike. Bending loads on the released blade increase due to contact between the blade tip and the hard case or containment structure inner surface. The blade breaks at the tip on the hard case, which is normally bolted or bonded to a stiff containment structure. The breakage creates a stump spanning from the blade root to the fractured tip with a relatively sharp edge that can penetrate the case or containment structure in an in-plane strike. Thus, the case or containment structure is initially challenged in shear, so heavy and relatively expensive ballistic liners are used to mitigate this shear threat.

As will be described herein, the approach taken to containing blade release is to design the case and the blades cooperatively with a built-in, synergistic compliance such that upon impact of a released blade with the case, the blade bends rather than breaking at the tip. To achieve bending rather than breakage during an in-plane strike, the bending strain must not exceed a critical or threshold material limit over the time period of the blade release to the time following the blade impact. In this regard, the fan blades 42 disclose herein are designed with a bending compliance through use of softer, malleable materials, such as aluminum alloys. The bending compliance is further enhanced by use of hollow cavities to locally reduce material thickness and allow a greater bending factor (at an inner bending radius where the material fails). In other words, thinner materials can be bent at tighter radii in comparison to thicker materials, such as sheet metal. Additionally, a fan case surrounding the fan blades 42 is designed with dynamic compliance to further the lower the strain induced on a released one of the fan blades 42. The following examples will further demonstrate the concepts disclosed herein.

Figure 2:
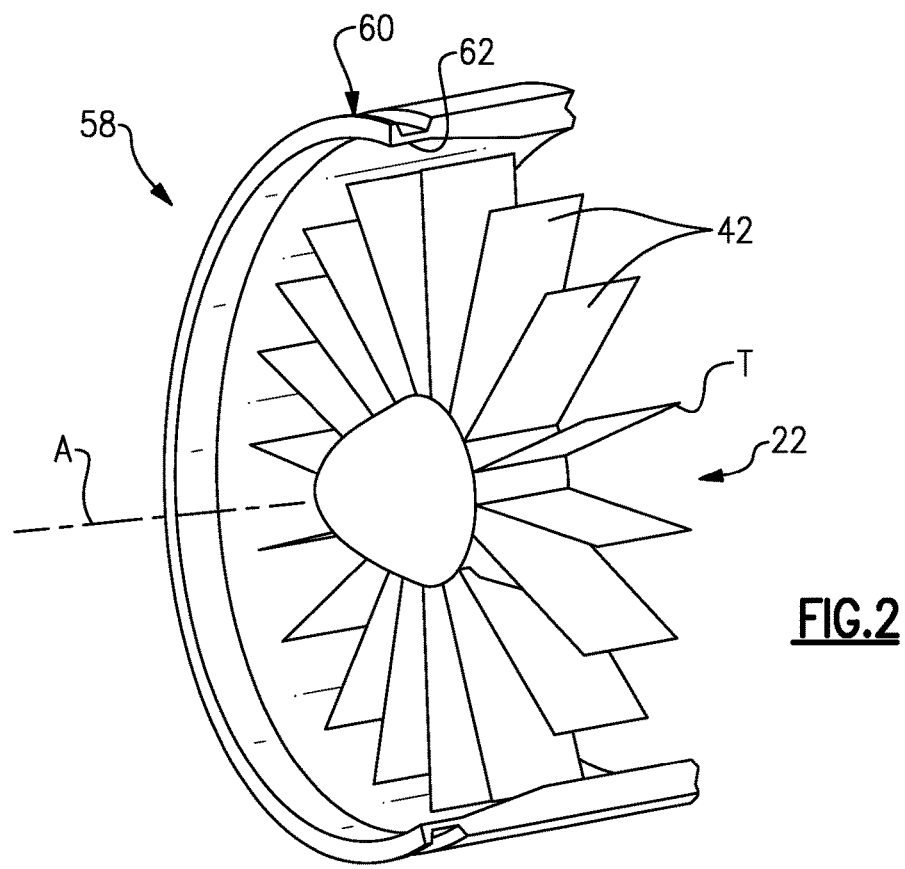
FIG. 2 illustrates a perspective view of a portion of a fan section of the engine of FIG. 1.

FIG. 2 illustrates an isolated view of a portion of the fan section 22. The fan section 22 includes a blade containment system 58, which includes the plurality of fan blades 42 and an annular containment structure 60 that extends around the blades 42. Each of the blades 42 has a corresponding blade compliance and the annular containment structure 60 includes a liner 62 that has a liner compliance. The blade compliance and the liner compliance are configured or selected such that a strain induced on a released one of the blades 42 upon impact of the blade 42 with the liner 62 is less than a threshold critical strain beyond which the blade 42 fractures. In other words, the annular containment structure 60 and the blades 42 and the liner 62 are designed with a cooperative compliance such that the released blade bends rather than breaks during the impact.

FIG. 3 illustrates a further example of the blade containment system 58. In this example, the annular containment structure 60 includes the liner 62, which serves as an inner liner, and an outer liner 64 with respect to the radial location in relation to the blades 42. The outer liner 64 can be a relatively stiff material, such as a composite or metallic case.

The inner liner 62 includes multiple layers that can be provided as a replaceable cartridge, for example. In this example, the inner liner 62 includes an abradable layer 66 and a honeycomb structure 68 adjacent to the abradable layer 66. The honeycomb structure 68 and the abradable layer 66 can be bonded together with each other and to a forward case liner 70. The honeycomb structure 68 and abradable layer 66 thus form a modular cartridge that can be replaced in the annular containment structure 60 by removing the cartridge and replacing it with a new cartridge as needed. The modular cartridge is removable without destroying the surrounding structure or the cartridge itself, for example.

The outer layer 64 and the inner liner 62 are arranged such that there is a hollow cavity 72 radially there between. As an example, the hollow cavity 72 may contain a gas, such as air and include a vent structure 74 located aft of the hollow cavity 72, as indicated in FIG. 3, that is configured to ventilate the gas from the hollow cavity 72. In this regard, the blade containment system 58 also includes a plurality of openings 75 that can serve as vents/drains for air, water or both. As shown in FIG. 4, the vent structure 74 includes a channel 80 that extends adjacent another honeycomb structure 82 aft of the honeycomb structure 68. One or more openings 75 are located radially inwards of the honeycomb structure 82, and one or more additional openings 75 are provided radially outwards of the radially inwards openings 75. In this example, the honeycomb structure 82 also includes intercellular slots 84 that serve to fluidly connect adjacent cells of the honeycomb structure 82. The slots 84 permit air, water or both to vent to the openings 75.

FIG. 5 is a schematic, axial view of the blade containment system 58 according to the view line illustrated in FIG. 3 and illustrates angular locations L1, L2 and L3 where the openings can be provided. In this example, angular locations L1 and L2 are offset by approximately 120°, and angular location L3 is intermediate L1 and L2, such as mid-way between L1 and L2. In one example, openings 75 at the radially outer surface of outer liner 64 shown in FIG. 3 are located at angular locations L1, L2 and L3. In a further example, openings 75 at the radially inner surface of outer liner 64 shown in FIG. 4 are also located at angular locations L1, L2 and L3. In a further example, opening 75 at the radially inner surface of forward case liner 70 shown in FIG. 3 is located at angular location L3.

FIG. 3 also shows a portion of one of the blades 42. In this example, the blade 42 includes an airfoil section 76 having a free tip T. At least the airfoil section 76 of the blade 42 can be fabricated from an aluminum alloy, which is a relatively light weight and malleable material. The aluminum alloy contributes to providing the desired blade compliance of the blades 42. To further influence the blade compliance of the blades 42, each of the blades 42 also includes at least one interior cavity 78. In the illustrated example, each of the blades 42 includes two such interior cavities 78. In a further example, the one or more interior cavities 78 are hollow interior cavities. In one alternative, the interior cavities 78 are not hollow but are filled with a foam material, such as aluminum foam.

The one or more interior cavities 78 are geometrically located to enhance bending compliance of the blades 42. For example, the one or more interior cavities 78 are elongated along a chord direction CD of the blade 42. In other words, the interior cavities 78 are elongated along the bending axis about which the blade 42 would bend upon impact with the annular containment structure 60.

Figure 7:
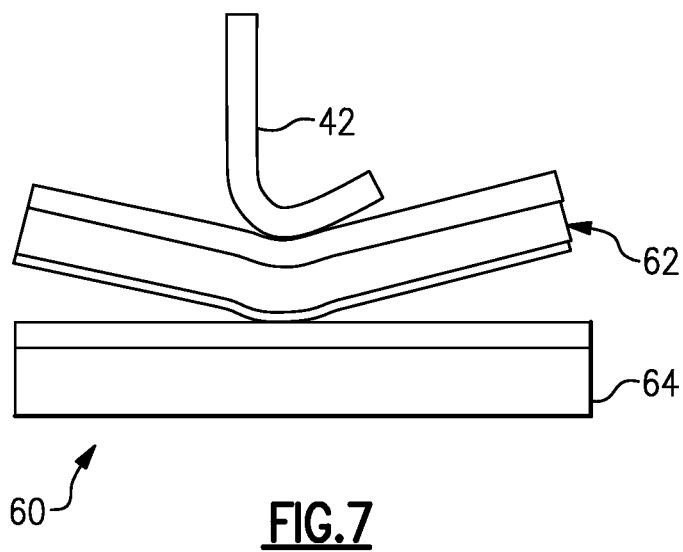
FIG. 7 illustrates bending of a released blade during an impact event.

FIGS. 6 and 7 schematically illustrate release and impact of one of the blades 42 with the annular containment structure 60. Upon release of the blade 42 and impact with the annular containment structure 60, the liner compliance and the blade compliance cooperate to result in bending of the released blade 42 rather than breakage at the blade tip. The hollow cavity 72 allows freer movement of the liner 62 during the impact and thus serves to lower strain on the released blade 42. As shown in FIG. 6, the liner 62 distorts upon impact to provide additional contact surface area and increase blade tip contact surface (and reduce localized bending load). Further, the design of the blade 42 with regard to the material selected and interior cavity 78 allow the blade 42 to bend rather than break. Additionally, the vent 74 of the hollow cavity 72 can be used to soften the impact by an "airbag-effect." Thus, upon impact, the released blade 42 bends rather than breaks. The impact and the bending reduce the shear threat and instead produce a compressive load on the annular containment structure 60, which is much more manageable than a shear load or threat.

Figure 8:
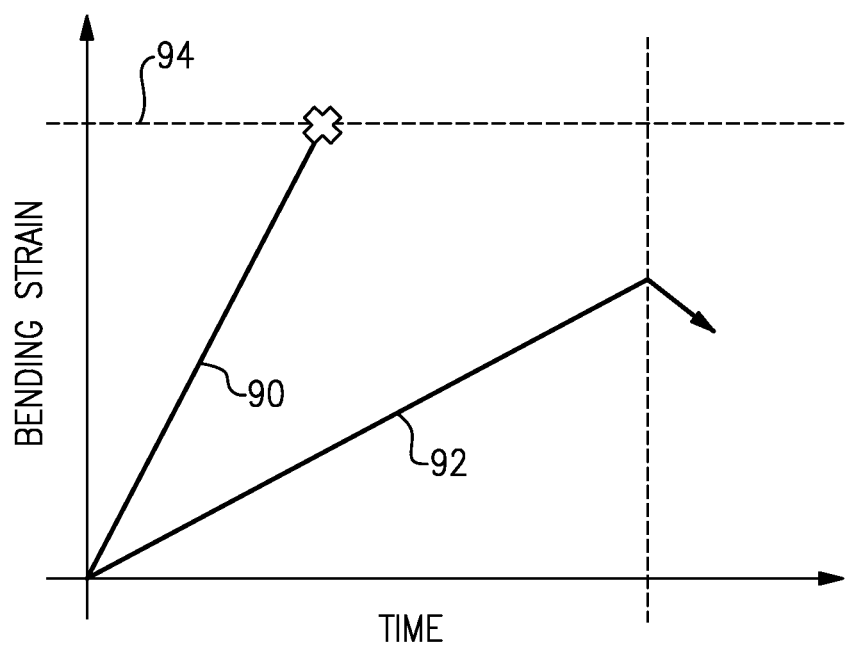
FIG. 8 graphically illustrates two comparison blade impact events.

FIG. 8 graphically illustrates a comparison of impact events between a system that is not designed according to this disclosure and the disclosed blade containment system 58. In the graph, line 90 represents an impact in a system that is not designed according to this disclosure and line 92 represents an impact in the disclosed blade containment system 58. As can be appreciated, in the impact at line 90, the bending strain increases rapidly until a critical threshold strain is reached at 94. Above the critical threshold strain, the tip of the released blade fractures or breaks and thus produces a shear threat on the containment structure. In comparison, the release event of the disclosed blade containment system 58 represented at 92 is extended over a longer period of time, thus reducing the bending strain to a level that does not exceed the critical threshold strain 94 beyond which the blade would fracture. Thus, the tip of the blade does not break and it produces a compressive stress on the containment structure rather than try to shear through it. The disclosed containment structure thus facilitates blade containment by reducing shear threat.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A blade containment system comprising:
   a plurality of circumferentially-arranged rotatable blades, each blade having a blade compliance; and
   an annular containment structure radially outward from the rotatable blades, the annular containment structure including a liner having a liner compliance, the blade compliance and the liner compliance being configured such that a strain induced on a respective one of the rotatable blades upon impact with the liner is less than a threshold critical strain beyond which the rotatable blades fracture, wherein the liner includes an inner liner and an outer liner, the inner liner being composed of an adbradable layer and a honeycomb, a hollow cavity located radially between the honeycomb and the outer liner, a purge channel connecting to the hollow cavity and a vent configured to selectively ventilate a gas from the hollow cavity, wherein the vent includes a plurality of vent openings and is located downstream of the rotatable blades, the purge channel extending adjacent another, downstream honeycomb, and at least a portion of the plurality of vent openings are radially inwards of the downstream honeycomb.

2. The system as recited in claim 1, wherein each of the rotatable blades includes an interior cavity.

3. The system as recited in claim 2, wherein the interior cavity is elongated along a chord-direction of each of the rotatable blades.

4. The system as recited in claim 2, wherein the rotatable blades are made of aluminum alloy.

5. The system as recited in claim 1, wherein the inner liner is a modular cartridge.

6. The system as recited in claim 1, wherein the downstream honeycomb includes intercellular slots that connect adjacent cells of the downstream honeycomb to the plurality of vent openings.

7. The system as recited in claim 6, wherein a portion of the plurality of vent openings open radially outwards.

* * * * *